Jan. 27, 1959  J. S. PARKER  2,870,576
AUTOMATIC TREE INJECTOR
Filed Jan. 2, 1958
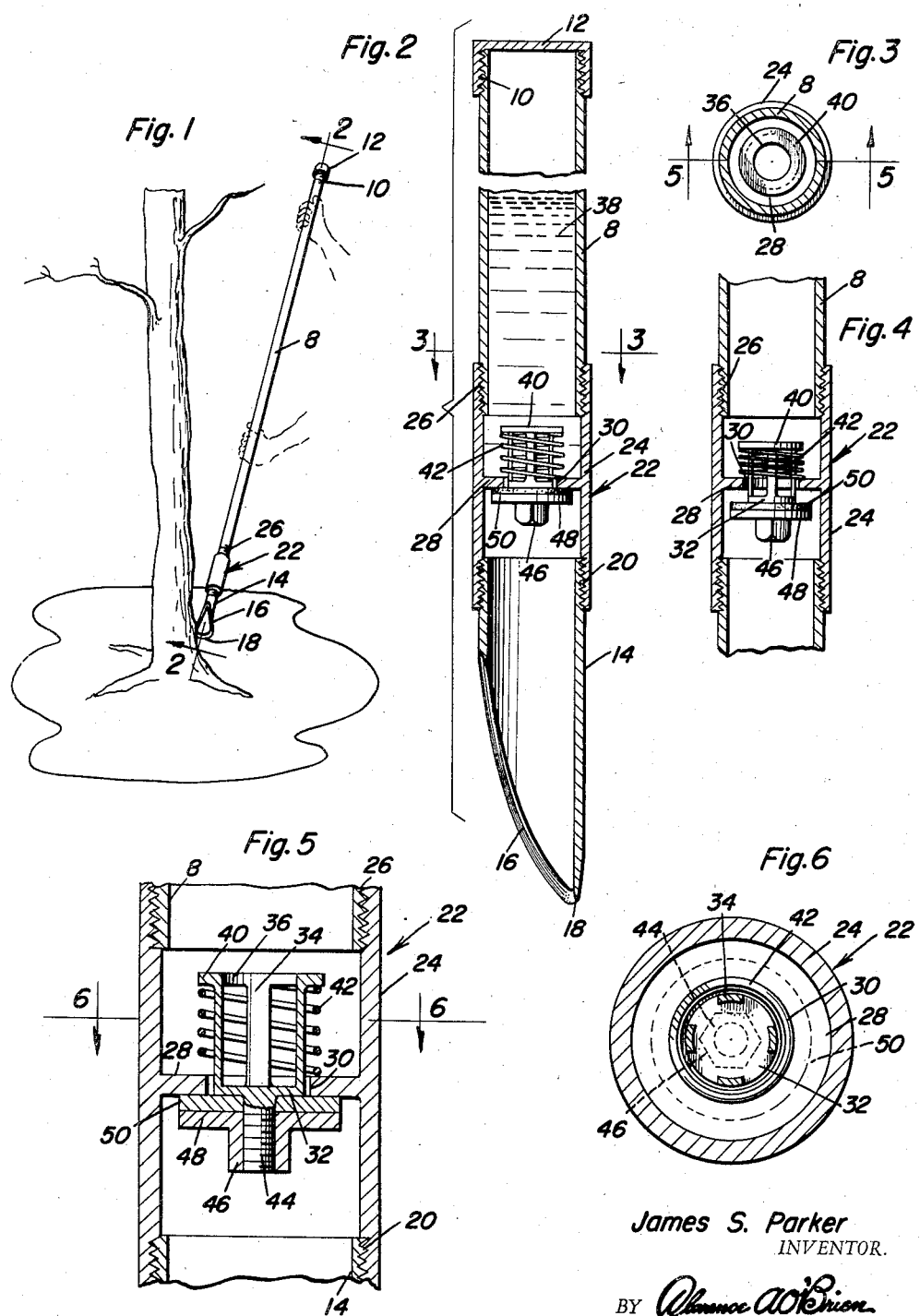
James S. Parker
INVENTOR.

United States Patent Office 2,870,576
Patented Jan. 27, 1959

2,870,576
AUTOMATIC TREE INJECTOR

James S. Parker, Troy, Ala., assignor of one-half to James G. Clower, Troy, Ala.

Application January 2, 1958, Serial No. 706,699

3 Claims. (Cl. 47—57.5)

The present invention relates to a novel and improved manually usable automatic tree injector which is characterized by an elongated barrel which functions as a container or reservoir for a chemical liquid and wherein the lower or leading end of the barrel is suitably valved and provided with a bark penetrating and cleaving blade, the valve means being thrust-responsive and momentarily openable to inject a predetermined amount of the liquid into the base of the tree.

As the preceding general statement of the subject matter of this invention implies, tree injectors of many and varied constructions have been devised and used by others working in this line of endeavor. In such circumstances it will be apparent that an object of the instant invention is to structurally, functionally and otherwise improve upon prior art adaptations and, in doing so, to provide a highly practical and feasible adaptation which meets manufacturing requirements and economies of manufacturers and labor and time-saving requirements of users.

More explicitly, it is an object of the invention to improve upon prior Patent 2,687,598 granted to Calhoun. Briefly and broadly, the Calhoun construction has to do with a tubular casing having a blade on one end and a storage chamber at the opposite end, a valve in the casing positioned between the storage chamber and the blade, and resilient holding means positioned to yield, whereby the valve opens for an instant when the end of said blade strikes an obstruction.

In carrying out the more specific and structural aspects of his ideas the patentee Calhoun utilizes a plug with an opening therebetween threaded in the inner end of the casing, a ball having a stem extended therefrom and positioned in the opening in the plug with the stem extending through the opening, a washer secured on the inner end of the stem of the ball, and a spring on the stem and positioned between the plug and the washer.

By way of comparison and contrast the instant invention as will be more explicitly pointed out comprises a rigid galvanized pipe (alternatively, a barrel, cylinder or casing), the upper screw-threaded end of which is closed by a screw cap. This pipe or barrel functions not only as a suitable thrust-type handle but a reservoir for the chemical liquid which is to be dispensed and injected into a tree. A coupling is detachably mounted on the leading or lower end of the pipe or barrel and serves to unite a cleaving-type blade with said barrel so that when the barrel is forcibly "thrown" at the tree base, after taking proper aim, the cutting and dispensing lip of the blade cleaves into the cambium layers of the tree's bark and thus impregnates the tree.

The coupling is significant and highly important in that it supports as well as houses the normally closed spring-biased valve, an arrangement wherein, when the cleaving blade is driven home, the driving impact against the tree utilizes the attending shock and causes the valve to pop open for a moment. This trip-action of the valve permits the escaping chemical liquid to shoot into the gash and thus the tree is effectually inoculated.

In carrying out a preferred embodiment of the invention at bar an elongated coupling is utilized. It is mounted, preferably removably on the lower or leading end of the barrel. A tubular tree impacting and liquid directing as well as dispensing member is then separably connected to the leading end of the coupling. It terminates in an oblique-angled sharp-edged tree cleaving blade. By contrast with Calhoun the upper end of said member is spaced from the adjacent lower end of the barrel and provides a valve space and chamber. An inertia responsive and impact projected normally closed valve is housed in the chamber portion of the coupling, being wholly supported by a seating flange provided therefor in the median portion of the coupling.

The above-mentioned coupling with its flange and spring biased valve constitutes what may be conveniently referred to as a valve assembly, that is, the coupling combined with the valve. This is made and sold as a unit and the valve and its parts are accessibly confined in the coupling. It is characterized by a spring-returned openwork cage, the latter being guided and operating against a sensitive pressure responsive spring, the cage being reciprocable in the central opening provided by way of the valve supporting flange. In addition it has a reduced axial screw-threaded stud on one end and provides a novel support for the coil spring and also the nut-equipped ring below the flange which serves as a valving disk.

Other objects, features and advantages will become more readily apparent from the following description and the accompanying drawing.

In the drawing wherein like numerals are employed to designate like parts throughout the views:

Fig. 1 is a view in perspective showing the improved automatic tree injector and generally how it is constructed and intended for use.

Fig. 2 is an enlarged view in section, with parts in elevation, taken on the plane of the line 2—2 of Fig. 1, looking in the direction of the arrows.

Fig. 3 is a cross-section on the line 3—3 of Fig. 2.

Fig. 4 is a view based on Fig. 2 showing the spring-biased action projected valve in its open liquid or fluid releasing position.

Fig. 5 is a section on a larger scale taken on the line 5—5 of Fig. 3 and showing the aforementioned valve assembly with greater particularity.

Fig. 6 is a cross-section on the line 6—6 of Fig. 5.

The barrel (casing or cylinder) comprises a length of pipe or tubing and is denoted by the numeral 8 and is of appropriate length and heaviness. The upper end is open and screw-threaded at 10 to accommodate a closing cap 12. Any other suitable form of simple closure may be obviously, employed. The lower end of the structure is characterized, as before stated, by a thrust-type and liquid receiving and dispensing member 14. This comprises a short length of pipe the left-hand portion of which is mitered with the edges sharpened at 16 and merging into an arcuate axe-like cutting point 18. This member as an entity constitutes a cutting blade and is adapted to be thrust into the cambium layers of the base of the tree in a now generally well-known manner. The upper end portion of this member is screw-threaded at 20 and screwed into the screw threads on the lower end of the aforementioned valve assembly 22. This assembly is characterized primarily by a simple tubular coupling 24, the upper end of which is also screw-threaded to accommodate screw threads 26 on the lower end of the barrel. The barrel, coupling and cutting blade are thus in axial cooperative alignment. As best shown in Fig. 5 the median portion of the coupling is provided with an integral annular flange or ledge 28 which provides a valve mount and also a valve seat and the central opening of which provides a guide opening 30. The valve means is of a composite type and is characterized as before mentioned by a reciprocable openwork cage 32 having circumferentially spaced components 34 providing an open top 36 for free entrance of the liquid or chemical fluid 38. On the upper end there is an outstanding flange providing a shoulder 40 for the lightweight pressure responsive coil spring 42. The spring surrounds the cage and bears at one end against the shoulder and at its opposite end against the valve seat or flange 28. The lower portion of the cage is imperforate so that the thrust of the down-coming fluid impinges thereon to assist in opening the valve. This lower end portion is normally contained in the guide opening and obviously rides through the guide opening when the necessary shock is imparted to the over-all implement. A central extending stud 44 is carried by the bottom of the cage and serves to accommodate a nut or collar 46 carrying the valve disk 48. The disk is provided with a packing ring 50 and as is obvious from Fig. 5 the spring normally keeps the valve closed. This is the position seen in Figs. 2 and 5. When the implement is thrust against the base of the tree in the manner illustrated in Fig. 1 the spring is compressed and the cage slides through the opening 30 when the valve opens. This means that the valve pops open momentarily and releases a predetermined amount of liquid. The liquid shoots down through the tubular member 14 and is injected into the tree in a now well-known manner. There are so many of these injectors patented and in use that a more elaborate description of the purposes and mode of use and features and advantages is believed to be unnecessary.

It is to be pointed out, however, that instead of using Calhoun's ball valve 12, the present invention employs a flanged collar or nut faced with a renewable packing ring. This permits the valve to be removably mounted on the screw-threaded stud. The cage is sufficiently heavy that it cooperates with the sensitive spring in achieving the valve opening step desired. The valve assembly is removable and the spring abutting washer or shoulder is integral with the openwork cage. The cage is not only a support for the coil spring, it is a spring resisted guide of requisite heaviness which is projectable into the liquid discharge opening. It is to be noted too that the valve means is housed in the median portion of the sleeve-type coupling to provide an accessible novel valved entity which is obviously a distinction over the Calhoun construction. Other novel characteristics are present but perhaps need not be touched upon here.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in conjunction with and between adjacent ends of a liquid containing barrel and a tubular thrust-type liquid dispensing and injecting blade, a ready-to-use and replaceable valve assembly comprising a linearly straight open ended sleeve screw-threaded at its ends and providing a coupling, said sleeve being provided on its interior and intermediate its ends with a centrally apertured flange providing a valve opening and also a valve seat, an openwork cage having an imperforate bottom, open at the top and provided at the top with an outstanding flange, said bottom being located normally in said guide opening, a coil spring surrounding the cage and bearing at its lower end on said flange and at its upper end on a shoulder carried by the cage, the bottom of said cage having a reduced screw-threaded stud, a nut threaded on said stud and provided with a valve disk, said disk being cooperable with the underneath side of said flange and providing the desired valving action.

2. An automatic tree injector comprising an elongated barrel adapted to contain a chemical liquid, said barrel of a length and prerequisite weight to serve as a suitable thrust-type handle, a tubular coupling removably mounted on the lower leading end of said barrel, a tubular tree impacting, liquid directing and dispensing member separably connected to the leading end of said coupling and terminating in a sharp-edged oblique-angled tree cleaving blade, the upper end of said member being spaced from the adjacent lower end of said barrel, and an inertia responsive and projected normally closed liquid releasing spring-biased valve operatively mounted in the median portion of said coupling and wholly supported by and housed within the coupling, and spaced from the cooperating ends of said barrel and member respectively, said coupling comprising an elongated sleeve the median portion of which is provided with an annular flange functioning as a valve seat and providing guide opening, said valve embodying a guide slidable through said guide opening and having a shoulder at the upper end thereof and a removable and renewable valve disk on the lower end, said disk seating against the underneath side of the flange, and a coil spring carried by said guide and bearing at its lower end on the flange and at its upper end against said shoulder.

3. The structure defined in claim 2, and wherein said guide comprises a cage reciprocable in the guide opening, said cage having an axial screw-threaded stud on its lower end, said valve disk having a screw-threaded collar providing a nut which is screwed on said stud, said coil spring being light in weight, of the proper tension to close and normally keep the valve closed, but so sensitive that it is responsive to a shock it receives when the blade is caused to forcibly strike the base of a tree or the like, whereby the valve pops open momentarily to release the liquid required for injection needs.

References Cited in the file of this patent

UNITED STATES PATENTS

| | | |
|---|---|---|
| 1,568,580 | Wright | Jan. 5, 1926 |
| 2,687,598 | Calhoun | Aug. 31, 1954 |
| 2,795,899 | Little | June 18, 1957 |

FOREIGN PATENTS

| | | |
|---|---|---|
| 8,462 | Australia | of 1913 |
| 2,677 | Australia | of 1921 |
| 73,011 | Austria | Jan. 25, 1917 |